J. M. BARRETT.
LOCK FOR CYCLES.
APPLICATION FILED FEB. 4, 1909.
927,927. Patented July 13, 1909.
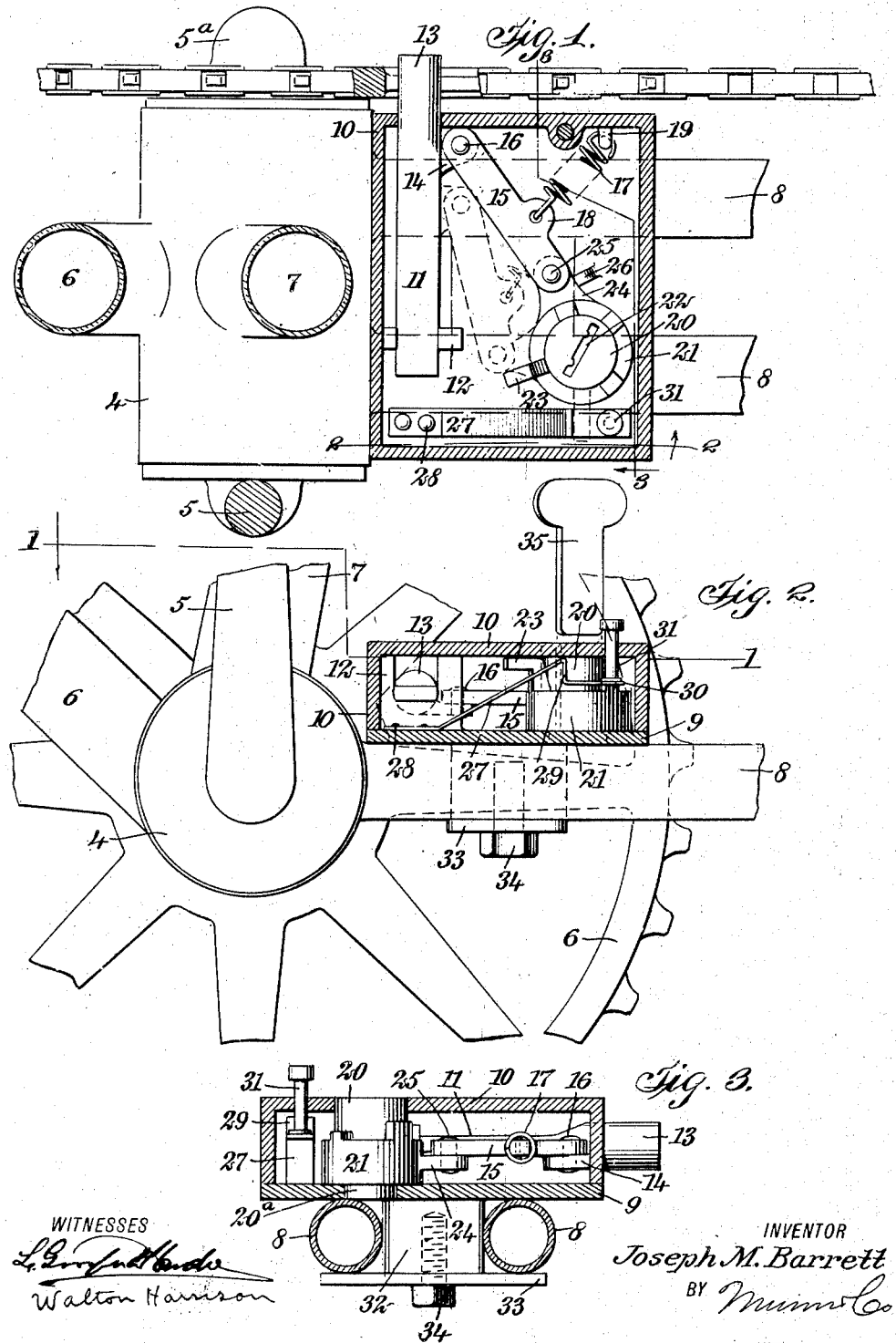
WITNESSES
INVENTOR
Joseph M. Barrett
BY
ATTORNEYS

UNITED STATES PATENT OFFICE.

JOSEPH MICHAEL BARRETT, OF FOSTORIA, OHIO, ASSIGNOR OF TWO-FIFTHS TO ADOLPH BORER, OF FOSTORIA, OHIO.

LOCK FOR CYCLES.

No. 927,927.           Specification of Letters Patent.           Patented July 13, 1909.

Application filed February 4, 1909. Serial No. 475,996.

*To all whom it may concern:*

Be it known that I, JOSEPH M. BARRETT, a citizen of the United States, and a resident of Fostoria, in the county of Seneca and State of Ohio, have invented a new and Improved Lock for Cycles, of which the following is a full, clear, and exact description.

My invention relates to locks, my more particular purpose being to provide a type of lock suitable for mounting upon a cycle of any kind, for the purpose of preventing the machine from being ridden by unauthorized persons.

More particularly stated, my invention comprehends a lock mounted upon the framework of a bicycle and provided with a movable bolt adapted to project throught the sprocket wheel, the bolt being so arranged that when in its normal position the bicycle can not be used, the bolt being withdrawn from the sprocket wheel by aid of a key carried by the operator.

Reference is to be had to the accompanying drawings forming a part of this specification, in which similar characters of reference indicate corresponding parts in all the figures.

Figure 1 is a section through the lock and parts associated therewith, and is taken upon the line 1—1 of Fig. 2, looking in the direction of the arrow; Fig. 2 is a vertical section through the lock, upon the line 2—2 of Fig. 1, looking in the direction of the arrow; and Fig. 3 is a vertical section upon the line 3—3 of Fig. 1, looking in the direction of the arrow.

At 4 is a cylindrical casing forming part of the framework of a bicycle and at 5, 5ª are the cranks. Connected rigidly with the casing 4 are tubular supports 6, 7 constituting parts of the framework. Also connected rigidly with the casing are two tubes 8 and resting upon the latter is a plate 9. At 10 is shown a lock casing which, together with the plate 9, incloses various parts of the lock hereinafter described. A bolt is shown at 11 and is provided with a cylindrical portion 13 which projects outwardly from the casing. The bolt 11 slidably engages a plate 12 whereby it is held in proper working relation to the other parts.

The bolt 11 is provided with a lug 14 integral with it. A link 15 is connected with this lug by aid of a pin 16, the link 15 being provided with an eye 18, and a spring 17 is connected with this eye. This spring is also connected with an eye 19 which is formed inside of the casing 10. A revoluble knob 20 is encircled by a ring 21 and is provided with a key-hole 22. Mounted upon the ring 21 is a dog 23.

The ring 21 is provided with a lug 24, and this lug is connected by a pin 25 with the link 15. A lug 26 which is integral with the plate 9, projects slightly upward and serves as a limiting stop for the lug 24. A leaf spring 27 is connected by rivets 28 with the plate 9 and extends obliquely upward therefrom, as indicated in Fig. 2.

The leaf spring 27 is provided with a step 29 and with a horizontal portion 30 integral with this step. A foot pin 31 extends through the upper part of the casing 10 and is connected with the portion 30 of the spring 27. Whenever the foot pin 31 is depressed, the leaf spring 27 is bent downwardly so that the step 29 is lowered.

The knob 20 is provided with a reduced portion 20ª which extends through the plate 9. The ring 21 and knob 20, considered as a unit, are journaled partly upon the plate 9 and partly upon the upper portion of the casing 10, as will be understood from Fig. 3. Mounted centrally upon the plate 9 and extending downwardly therefrom is a boss 32, and disposed at the lower end of the same is a cross plate 33 which engages the under side of the tubes 8. A bolt 34 extends through the plate 33 and into the boss 32. By turning the bolt 34 the plate 33 is tightened against the under side of the tubes 8, and the plate 9 is thereby secured firmly upon these tubes.

In order to remove the lock, the bolt 34 is loosened and the plate 33 turned slightly so that the lock casing and parts immediately associated with it may be lifted directly upward. At 35 is a key adapted to fit into the key-hole 22 for the purpose of turning the knob 20 and ring 21.

The operation of my device is as follows: When the parts are in normal position, the spring 17, by pulling upon the link 15, turns the lug 24 into the position indicated in Fig. 1. While in this position, the bolt 11 is outward so that the part 13 extends through the sprocket wheel 6. The application of no key is necessary in order to enable the parts to assume this position, which coincides with the position which is the one assumed when the bicycle is not in use. The operator desiring to use the machine, places the key 35 in the key-hole 22 and turns the key in a contraclockwise direction. By this means the knob 20 is rotated about ¼ of a turn, as will be understood from the dotted lines in Fig. 1. The dog 23 is thus first brought into engagement with the upper surface of the leaf spring 27 and finally lodges against the step 29; that is to say, the key having turned the knob a little distance, the dog 23 is unable to retrograde and the key may now be withdrawn from the lock, the parts being held fixedly in position because the dog 23 is lodged against the step 29. By this movement the bolt 11 is withdrawn from the sprocket wheel, as will be understood from the dotted lines in Fig. 1. The machine is now ready for use. When it is desired to again lock the sprocket wheel, the operator merely places his foot upon the foot pin 31 and depresses the latter. By doing this, he moves the leaf spring 27 slightly downward so that the step 29 disengages the dog 23. This releases the ring 21 and enables the spring 17, by pulling upon the link 15 (see Fig. 1), to turn the ring 21 until the lug 24 engages the limiting stop 26 and thrusts the bolt 11 outward so that the part 13 of this bolt again extends through the sprocket wheel and locks the machine.

Having thus described my invention, I claim as new and desire to secure by Letters Patent:

1. In a lock for cycles, the combination of a casing, a bolt slidably mounted therein and adapted to engage a wheel or the like, a leaf spring mounted within said casing and provided with a step, a revoluble knob mounted within said casing, a dog connected with said revoluble knob and adapted to engage said step of said leaf spring, a bolt, mechanism connected with said bolt for actuating the same, said mechanism being connected with said revoluble knob, a spring for holding said mechanism in a predetermined normal position, and means including a key for turning said revoluble knob so as to enable said dog to engage said step.

2. In a lock for cycles, the combination of a casing, a bolt slidably mounted therein and adapted to engage a wheel or the like, a link pivotally connected with said bolt, a revoluble member mounted within said casing and pivotally connected with said link, a spring connected with said link and adapted to pull the same in a direction lateral to the general direction of the length of said link, a limiting stop for preventing rotation of said revoluble member beyond a predetermined point, means for enabling the operator to turn said revoluble member into a predetermined position for the purpose of increasing the tension of said spring and of withdrawing said bolt from said wheel or the like, and means for holding said revoluble member in said position into which it is thus turned, and mechanism controllable at will for releasing said revoluble member.

3. In a lock for cycles, the combination of a casing, a bolt movable relatively thereto and adapted to engage a wheel or the like, a link pivotally connected with said bolt, a revoluble member mounted within said casing and provided with a lug, a pivot connecting said lug and said link together, a limiting stop for preventing excessive travel of said lug and said link, a spring connected with said link for the purpose of drawing the same toward said lug, said limiting stop being so located that when said lug lodges against it the pressure of said bolt through said link forces said lug against said limiting stop, means for turning said revoluble member for the purpose of stretching said spring, and mechanism controllable at will for holding and releasing said revoluble member.

In testimony whereof I have signed my name to this specification in the presence of two subscribing witnesses.

JOSEPH MICHAEL BARRETT.

Witnesses:
DANIEL WEEK,
C. A. GUERNSEY.